(12) United States Patent
Watanabe et al.

(10) Patent No.: US 10,614,563 B2
(45) Date of Patent: Apr. 7, 2020

(54) EVALUATION DEVICE AND RECORDING MEDIUM STORING EVALUATION PROGRAM

(71) Applicant: Ricoh Company, Ltd., Tokyo (JP)

(72) Inventors: Shuhei Watanabe, Chiba (JP);
Takuroh Sone, Kanagawa (JP);
Hideyuki Kihara, Kanagawa (JP);
Takayuki Gotoh, Kanagawa (JP);
Takashi Soma, Kanagawa (JP);
Akihiro Iwamatsu, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 22 days.

(21) Appl. No.: 15/994,168

(22) Filed: May 31, 2018

(65) Prior Publication Data

US 2018/0350059 A1  Dec. 6, 2018

(30) Foreign Application Priority Data

May 31, 2017  (JP) ................................ 2017 -108484

(51) Int. Cl.
*G06T 7/00* (2017.01)
*G01N 21/84* (2006.01)
(Continued)

(52) U.S. Cl.
CPC ....... *G06T 7/0002* (2013.01); *G01N 21/8422* (2013.01); *G06K 9/4652* (2013.01);
(Continued)

(58) Field of Classification Search
CPC ...... G01J 2003/467; G01N 2021/8829; G01N 21/31; G01N 21/55; G01N 21/8422;
(Continued)

(56) References Cited

U.S. PATENT DOCUMENTS 4,846,578 A * 7/1989 Morita ................. G01B 11/303
356/446
5,138,671 A * 8/1992 Yokoyama ............... G06K 9/38
358/466
(Continued)

FOREIGN PATENT DOCUMENTS

JP  2007-155709  6/2007
JP  2017-173300  9/2017

OTHER PUBLICATIONS

Extended European Search Report dated Oct. 4, 2018 in European Patent Application No. 18173895.6, 7 pages.

*Primary Examiner* — Peter D Le
(74) *Attorney, Agent, or Firm* — XSensus LLP

(57) ABSTRACT

An evaluation device includes a projector to project a pattern having an edge component onto an object, an imaging device to capture an image of the object, a reflective-property correction unit to correct an amount of change in shape of a virtual image of the pattern reflected in the object, using reflective-property data of a surface of the object, and an evaluation-value calculator to evaluate image clarity of the surface of the object based on the corrected amount of change. A computer-readable non-transitory recording medium storing a program for causing a computer to execute a method. The method includes correcting an amount of change in shape of a virtual image of the pattern reflected in the object based on image data that is obtained by capturing an object onto which a pattern having an edge component is projected, using reflective-property data of a surface of the object.

13 Claims, 14 Drawing Sheets

(51) Int. Cl.
*G06T 7/136* (2017.01)
*G06T 7/13* (2017.01)
*G06K 9/46* (2006.01)
*H04N 5/33* (2006.01)
*G01N 21/55* (2014.01)
*G01N 21/88* (2006.01)
*G01N 21/31* (2006.01)
*G01J 3/46* (2006.01)
*G06K 9/38* (2006.01)
*G06K 9/36* (2006.01)

(52) U.S. Cl.
CPC .............. *G06K 9/4661* (2013.01); *G06T 7/13* (2017.01); *G06T 7/136* (2017.01); *H04N 5/332* (2013.01); *G01J 2003/467* (2013.01); *G01N 21/31* (2013.01); *G01N 21/55* (2013.01); *G01N 2021/8829* (2013.01); *G06K 9/38* (2013.01); *G06K 2009/363* (2013.01); *G06K 2009/4657* (2013.01); *G06T 2207/30168* (2013.01)

(58) Field of Classification Search
CPC ..... G06K 2009/363; G06K 2009/4657; G06K 9/38; G06K 9/4652; G06K 9/4661; G06T 2207/30168; G06T 7/0002; G06T 7/13; G06T 7/136; H04N 5/332
See application file for complete search history.

(56) References Cited

U.S. PATENT DOCUMENTS

| | | | | |
|---|---|---|---|---|
| 5,155,558 | A | 10/1992 | Tannenbaum et al. | |
| 5,241,188 | A * | 8/1993 | Mizutani | G03F 9/7026 250/548 |
| 5,589,904 | A * | 12/1996 | Urata | G03B 5/00 396/48 |
| 5,617,484 | A * | 4/1997 | Wada | G06K 9/38 382/156 |
| 6,248,486 | B1 * | 6/2001 | Dirksen | G03F 7/70241 430/296 |
| 8,585,956 | B1 * | 11/2013 | Pagryzinski | B41M 5/267 264/400 |
| 10,146,041 | B1 * | 12/2018 | Putman | G02B 21/244 |
| 10,165,194 | B1 * | 12/2018 | Baldwin | H04N 5/2355 |
| 10,241,471 | B2 * | 3/2019 | Hsiao | G03H 1/0866 |
| 2001/0053489 | A1 * | 12/2001 | Dirksen | G03F 7/70241 430/30 |
| 2002/0076089 | A1 * | 6/2002 | Muramatsu | G06K 9/0012 382/124 |
| 2002/0131597 | A1 * | 9/2002 | Hori | G06K 7/10574 380/256 |
| 2002/0171826 | A1 * | 11/2002 | Wiles | G01N 21/57 356/237.2 |
| 2003/0111534 | A1 * | 6/2003 | Hillmann | G06K 9/00067 235/454 |
| 2005/0007487 | A1 * | 1/2005 | Miyoshi | G01B 11/25 348/362 |
| 2007/0184373 | A1 * | 8/2007 | Mertens | G01J 3/46 430/65 |
| 2007/0258070 | A1 * | 11/2007 | Fujiwara | G03F 7/70341 355/53 |
| 2007/0280557 | A1 * | 12/2007 | Choi | G03F 7/70633 382/294 |
| 2008/0210888 | A1 * | 9/2008 | Inoue | G03F 7/70225 250/492.22 |
| 2009/0091727 | A1 * | 4/2009 | Kwan | G03F 7/70591 355/63 |
| 2009/0169112 | A1 * | 7/2009 | Inoue | G06K 9/4661 382/199 |
| 2009/0316959 | A1 * | 12/2009 | Shibata | G01N 21/55 382/108 |
| 2010/0129739 | A1 * | 5/2010 | Hidaka | G03F 9/7026 430/30 |
| 2014/0022554 | A1 * | 1/2014 | Lim | G01B 9/0201 356/479 |
| 2014/0043602 | A1 * | 2/2014 | Engel | G01N 21/88 356/237.5 |
| 2014/0151535 | A1 * | 6/2014 | Mori | G01S 17/42 250/214.1 |
| 2014/0219561 | A1 * | 8/2014 | Nakamura | G06K 9/344 382/176 |
| 2015/0247724 | A1 * | 9/2015 | Yuki | G01B 11/303 356/600 |
| 2015/0271386 | A1 * | 9/2015 | Schneider | H04N 5/2254 348/349 |
| 2016/0040985 | A1 * | 2/2016 | Nagai | G01J 3/0208 356/328 |
| 2016/0131901 | A1 * | 5/2016 | Huang | G02B 26/06 250/201.9 |
| 2017/0208255 | A1 * | 7/2017 | Christen | G06T 7/90 |
| 2017/0270653 | A1 * | 9/2017 | Garnavi | G06T 7/0002 |
| 2017/0270655 | A1 | 9/2017 | Watanabe et al. | |

\* cited by examiner

EVALUATION DEVICE AND RECORDING MEDIUM STORING EVALUATION PROGRAM

CROSS-REFERENCE TO RELATED APPLICATION

This patent application is based on and claims priority pursuant to 35 U.S.C. § 119(a) to Japanese Patent Application No. 2017-108484, filed on May 31, 2017, in the Japan Patent Office, the entire disclosure of which is hereby incorporated by reference herein.

BACKGROUND

Technical Field

Embodiments of the present disclosure relate to an evaluation device and a recording medium storing an evaluation program.

Background Art

Conventionally, the image clarity of the surface of an object such as a coated plate, an aluminum plate, and lacquer ware is evaluated as an item of quality to be evaluated. For example, methods are known in the art in which the image clarity is evaluated by visual check, Japanese Industrial Standards (JIS) K 7374, or laser scanning. Moreover, technologies are known in the art in which the image clarity is evaluated as follows. A frosted glass is disposed between illumination (light source) and a sample, and the degree of distortion on the chart, which is reflected in the sample, is evaluated by calculating the standard deviation of the degree of distortion. Then, the obtained standard deviation of the degree of distortion is compared with the standard deviation of the sample that serves as a reference.

SUMMARY

Embodiments of the present disclosure described herein provide two types of evaluation devices and a computer-readable non-transitory recording medium storing a program for causing a computer to execute a method. One of the two types of evaluation devices includes a projector configured to project a pattern having an edge component onto an object, an imaging device configured to capture an image of the object, a reflective-property correction unit configured to correct an amount of change in shape of a virtual image of the pattern reflected in the object, using reflective-property data of a surface of the object, and an evaluation-value calculator configured to evaluate image clarity of the surface of the object based on the corrected amount of change. The other evaluation device includes a reflective-property correction unit configured to correct an amount of change in shape of a virtual image of the pattern reflected in the object based on image data that is obtained by capturing an object onto which a pattern having an edge component is projected, using reflective-property data of a surface of the object, and an evaluation-value calculator configured to evaluate image clarity of the surface of the object based on the corrected amount of change. The method includes correcting an amount of change in shape of a virtual image of the pattern reflected in the object based on image data that is obtained by capturing an object onto which a pattern having an edge component is projected, using reflective-property data of a surface of the object, and evaluating image clarity of the surface of the object based on the corrected amount of change.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
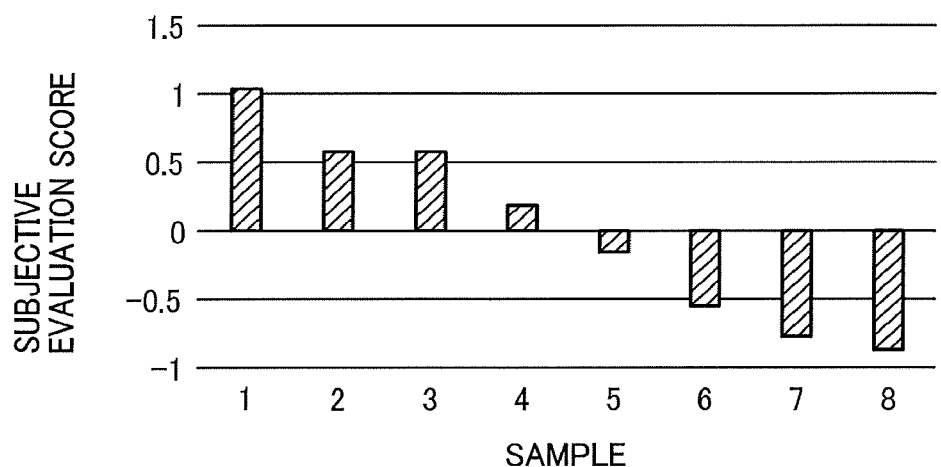
FIG. 1 is a diagram illustrating a result of a subjective evaluation experiment, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of an evaluation device and a recording medium storing an evaluation program according to an embodiment of the present disclosure are described below with reference to the drawings.

First Embodiment

In order to conduct image-clarity evaluation according to the present embodiment, standardized subjective evaluation scores may be used in addition to the measurement of physical values. Here, a subjective evaluation experiment for image clarity is described. In such a subjective evaluation experiment, a pair of to-be-evaluated objects (samples) are given to a test subject at random. Then, a test subject is requested to give a score, for example, as to whether the image clarity of the sample on the right is better than that of the sample on the left. Such an experimental method is referred to as paired comparison.

In order to conduct such paired comparison, eight color samples with different image clarity are prepared. The breakdown of the colors of these eight color samples includes black, red, blue, and silver. Note also that each of the red, blue, and silver samples are metallic. Moreover, the size of the samples is the American National Standards Institute (ANSI) Letter-size.

Here, a kind of paired comparison adopted in the description of the present disclosure, Scheffé's method, is described in detail. First, a pair of sample A and sample B are presented to a test subject, and the test subject is requested to make a comparison between the sample A and the sample B. Then, the test subject is requested to give one of the following five scores to the image clarity of the surface of the sample B, with reference to the sample A.

+2 points when A<<B
+1 point when A<B
0 point when A=B
−1 point when A>B
−2 points when A>>B The test subject is requested to make an evaluation from a position 500 mm away from each of the samples, in viewing environments where fluorescent light that is reflected in the surfaces of the samples or a virtual image of the face of the test subject himself/herself can be viewed. Note also that twenty image evaluation engineers are gathered as the test subjects. The evaluation score of each sample is calculated and obtained upon applying an analytical method of the quantification method type III to the result of the evaluation experiment.

FIG. 1 is a diagram illustrating a result of a subjective evaluation experiment, according to an embodiment of the present disclosure.

In FIG. 1, the horizontal axis indicates the numbers given to the samples (serial numbers), and the samples are arranged in the order of the subjective evaluation scores. The vertical axis indicates the subjective evaluation scores of the multiple samples, and a smaller value indicates better image clarity. In other words, as illustrated in FIG. 1, the evaluation result indicates that sample 8 has the highest image clarity and sample 1 has the lowest image clarity.

As illustrated in FIG. 1, the score difference is small between some of the neighboring pairs of the multiple samples. Thus, a test is performed to determine whether there is any significant difference in the order between the neighboring pairs of the samples that have close scores. As a result, it is found that there is no significant difference between sample 2 and sample 3, between sample 6 and sample 7, and between sample 7 and sample 8, respectively.

Before describing the image-clarity evaluation according to the present embodiment, the evaluation results obtained by an image-clarity measuring instrument according to the related art example are described.

Figure 2:
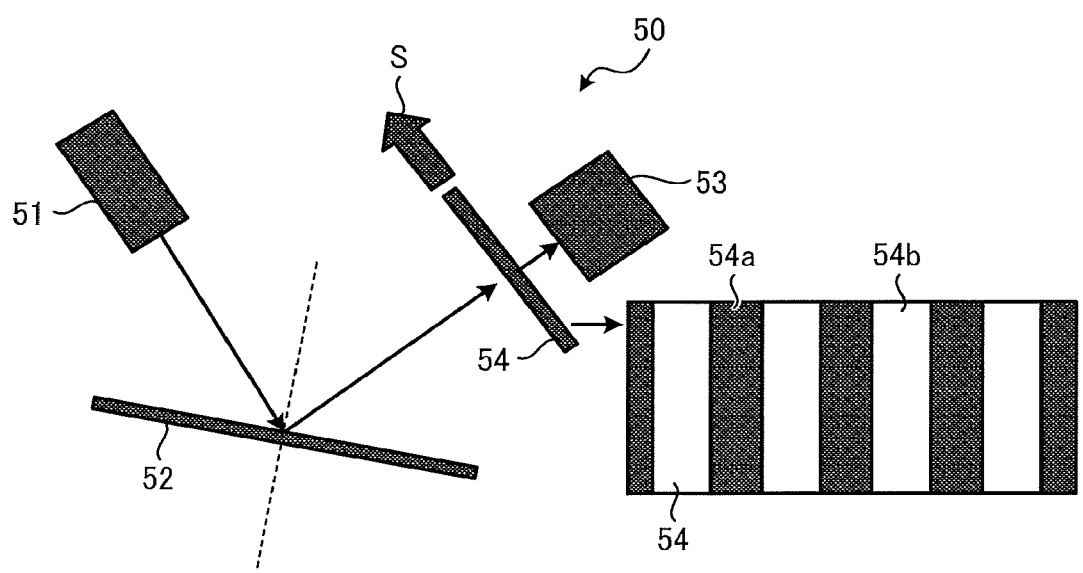
FIG. 2 is a diagram illustrating a general configuration of an image-clarity measuring instrument according to the related art.

FIG. 2 is a diagram illustrating a general configuration of an image-clarity measuring instrument 50 according to the related art.

The image-clarity measuring instrument 50 as illustrated in FIG. 2 measures the image clarity of a sample 52 based on JIS K 7374.

As illustrated in FIG. 2, in the image-clarity measuring instrument 50, the sample 52 is irradiated with the light emitted from a light source 51, and a photodetector 53 determines the level of the specular reflection light reflected by the sample 52. In the image-clarity measuring instrument 50, a plate 54 is disposed between the sample 52 and the photodetector 53. In the plate 54, a light shielding member 54a that blocks the light reflected by the sample 52 and a light transmission member 54b that allows the reflection light pass through are disposed in alternating sequence like a comb. The plate 54 moves in the directions of travel, and changes the level of the reflection light incident on the photodetector 53.

Figure 3:
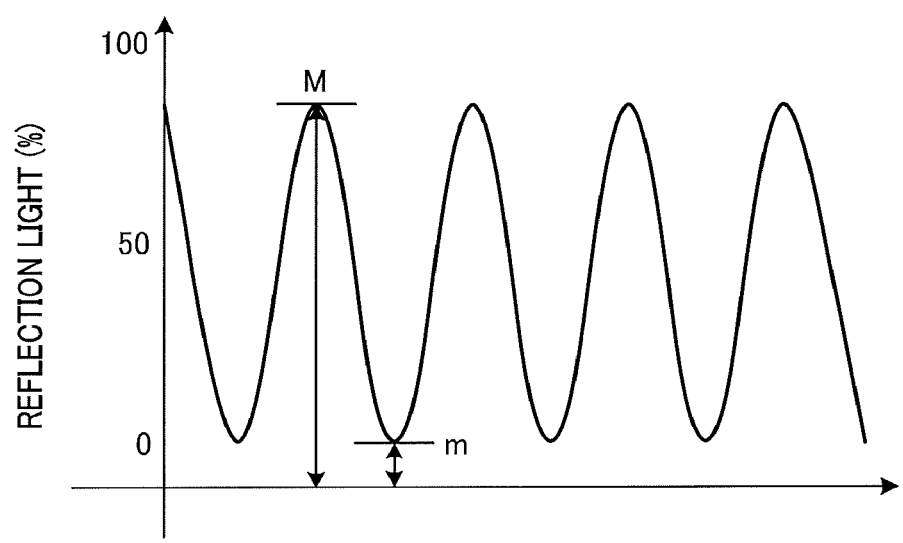
FIG. 3 is a diagram illustrating the level of reflection light that is changed by a plate according to the related art.

As illustrated in FIG. 3, the level of the reflection light that is changed by the plate 54 has a cyclic shape.

FIG. 3 is a diagram illustrating the level of reflection light that is changed by the plate 54, according to the related art.

In the image-clarity measuring instrument 50, the image clarity is evaluated by applying the maximum value M and the minimum value m to Formula 1 given below. In other words, the sample 52 with good image clarity exerts strong specular reflection, and thus the value of the maximum value M increases and the value of the minimum value m decreases. On the other hand, the sample 52 with bad image clarity produces a large amount of diffused light, and thus the value of the maximum value M decreases and the value of the minimum value m increases.

$$\text{Image Clarity} = \frac{M-m}{M+m} \times 100 \qquad \text{[Formula 1]}$$

The widths of the light shielding member 54a and the light transmission member 54b in the plate 54 include five levels of 0.125 mm, 0.25 mm, 0.5 mm, 1 mm, and 2 mm.

Figure 4A:
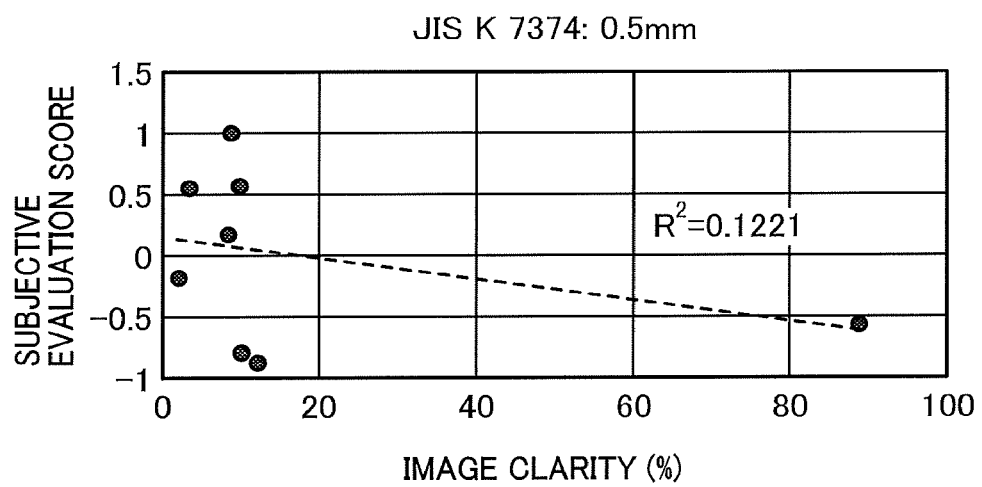
FIG. 4A is a scatter diagram of the measurement results and the subjective evaluation scores of the image clarity when the width of a light shielding member and a light transmission member according to the related art example is 0.5 mm.

FIG. 4A is a scatter diagram of the measurement results and the subjective evaluation scores of the image clarity when the width of the light shielding member 54a and the light transmission member 54b according to the related art example is 0.5 mm.

Figure 4B:
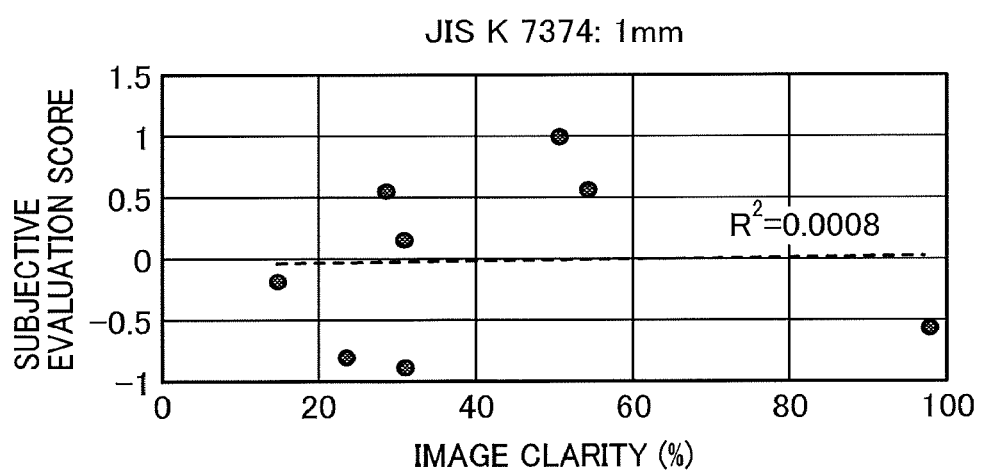
FIG. 4B is a scatter diagram of the measurement results and the subjective evaluation scores of the image clarity when the width of a light shielding member and a light transmission member according to the related art example is 1 mm.

FIG. 4B is a scatter diagram of the measurement results and the subjective evaluation scores of the image clarity when the width of the light shielding member 54a and the light transmission member 54b according to the related art example is 1 mm.

Note also that the same material as the eight samples used in the above subjective evaluation experiment is used as the sample 52.

As illustrated in FIG. 4A and FIG. 4B, the contribution ratios $R^2$ are 0.1221 and 0.0008, respectively, and these results indicate that there is no significant correlation. These results are due to the fact that only the (light and shade) contrast is calculated in a one-dimensional measurement, and it is possible that the measured value may be inverted or no significant difference is detected among the samples having a little difference in image clarity. Further, the colors of the samples to be measured are not taken into consideration in the related art example, and thus the evaluation values that indicate a little correlation with the image clarity that a human senses may be calculated and obtained.

Next, a configuration of an evaluation device 100 according to a first embodiment is described with reference to FIG. 5.

Figure 5:
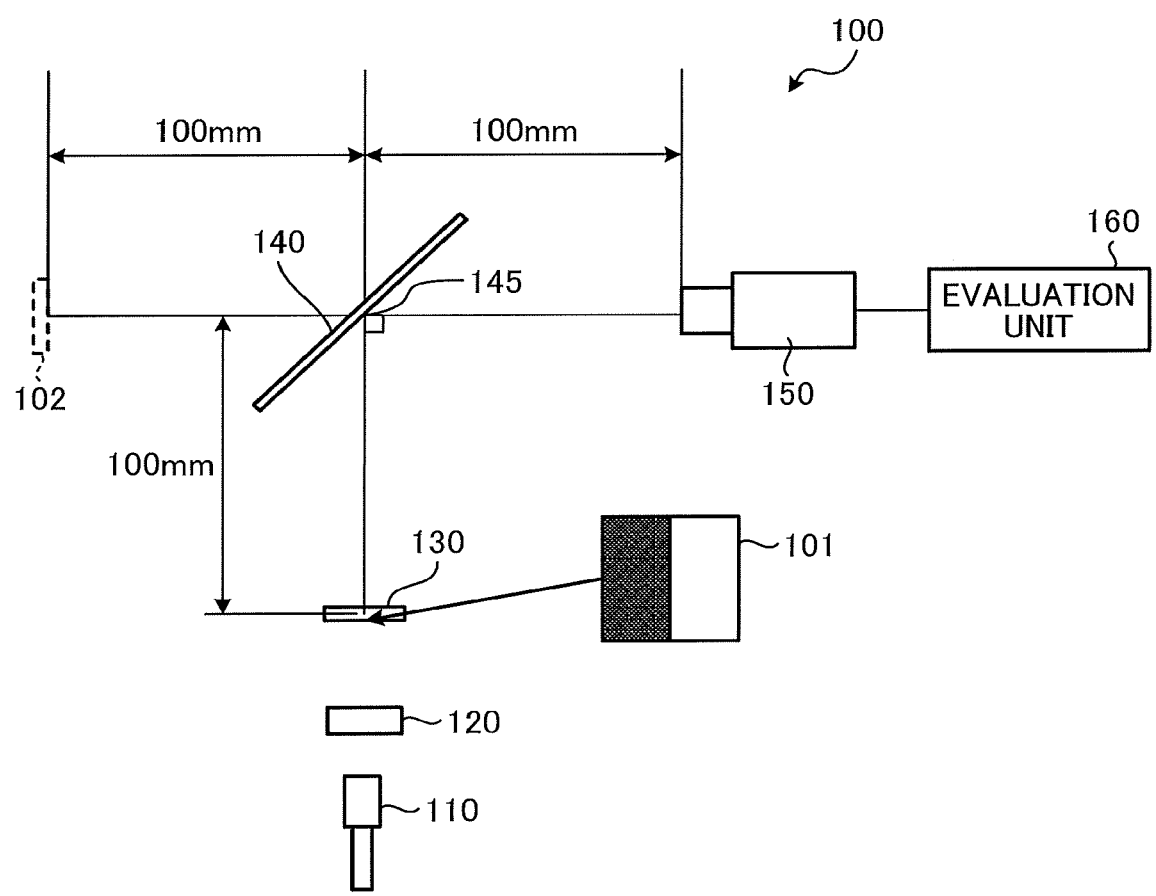
FIG. 5 is a schematic diagram illustrating an example configuration of an evaluation device according to the first embodiment.

FIG. 5 is a schematic diagram illustrating an example configuration of the evaluation device 100 according to the first embodiment.

As illustrated in FIG. 5, the evaluation device 100 includes a light source 110, a telecentric lens 120, a diffusing board 130, a sample stage 140, a hyperspectral camera 150, and an evaluation unit 160. A sample 145 is attached to the sample stage 140. Note that the light source 110 corresponds to a projector and the hyperspectral camera 150 corresponds to an imaging device.

The light source 110 may be implemented using, for example, a light-emitting diode (LED) light source and a xenon light source whose spectral distribution is similar to that of the sunlight. However, no limitation is intended thereby. In other words, the light source 110 may be selected according to the adopted sample 145 or the actual environment where the sample 145 is used. The light source 110 is arranged in a direction with the angle of 45 degrees with reference to the direction of the normal to the sample stage 140.

The telecentric lens 120 is a lens whose main light beam is parallel to the optical axis. The light that is emitted from the light source 110 is collimated by the telecentric lens 120, and an image is formed on the diffusing board 130. A projection pattern 101 is attached to the diffusing board 130 to detect the amount of change in shape that is caused depending on the quality of the image clarity. The projection pattern 101 is a two-dimensional pattern having an edge component. When a pattern has an edge component, it indicates that there is a difference in gradation (i.e., a difference in gradations of color) on the pattern. As illustrated in FIG. 5, as the projection pattern 101, a rectangular pattern with a black and white two-step gradation may be used. However, the projection pattern 101 is not limited to such a rectangular pattern with a black and white two-step gradation.

Figure 6:
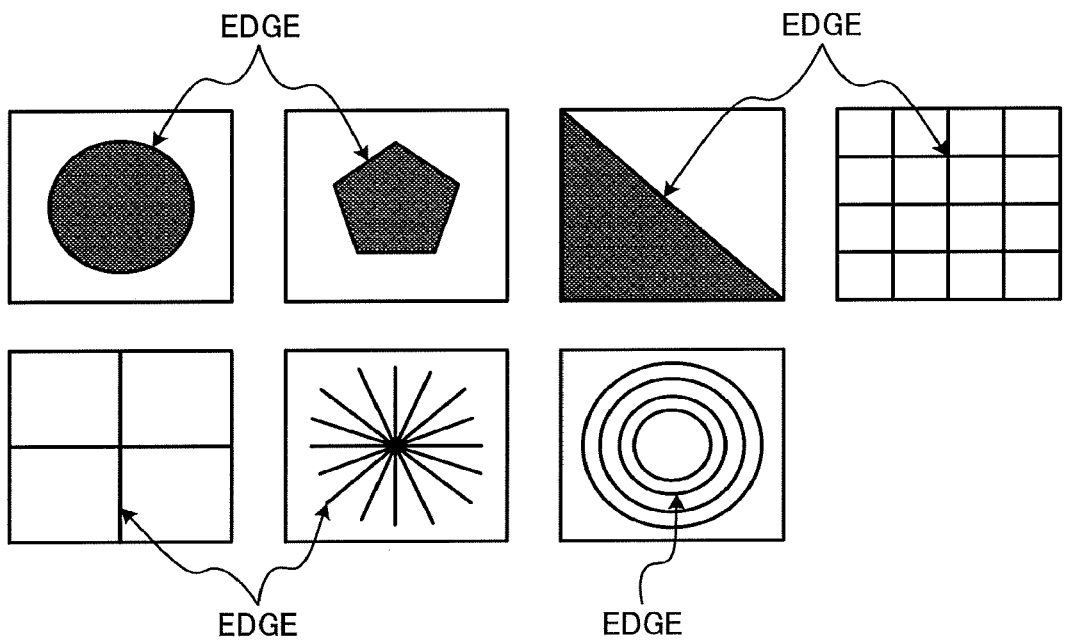
FIG. 6 is a diagram illustrating a projection pattern according to the first embodiment of the present disclosure.

FIG. 6 is a diagram illustrating a projection pattern 101 according to the first embodiment of the present disclosure.

As illustrated in FIG. 6, the projection pattern 101 may be, for example, straight lines or curved lines as long as there is a difference in gradation, or may also be, for example, a circle, a polygon, a lattice, a cross, a parabola, and multiple circles. When a circle or polygon, or a parabola is used, the edges become multidirectional. Accordingly, even a sample in which the image clarity of the surface of an object is anisotropic (the physical properties and characteristics change depending on the direction) can be evaluated. When a sample in which the image clarity of the surface of an object is uneven is evaluated, the evaluation may vary depending on the position at which measurement is made. As a pattern of multiple circles or lattice has multiple edges, evaluation can be made on an edge-by-edge basis in view of the variations within the surface. Note also that the colors of the projection pattern 101 are not limited to the two colors of black and white, and may be any color.

As illustrated in FIG. 5, the hyperspectral camera 150 is arranged at an angle of −45 degrees on the other side of the light source 110 with reference to the direction of the normal to the sample stage 140, and the light of specular reflection heads for the hyperspectral camera 150. Then, the hyperspectral camera 150 captures a virtual image 102 reflected in the sample 145 that is attached to the sample stage 140 to obtain two-dimensional image data. In other words, an image is captured upon aligning the focal point of the hyperspectral camera 150 with the virtual image 102. For example, the hyperspectral camera 150 can obtain spectral data for every 10 nm. The obtained two-dimensional image data is input to the evaluation unit 160. In other words, in the present embodiment, the angle that the light emitted from the light source 110 and incident on the sample 145 forms with the reflection light is designed to be 90 degrees such that the position at which the hyperspectral camera 150 captures an image is easily adjustable. Accordingly, the displacement of the virtual image 102 that is reflected in the sample 145 can be reduced to a minimum. The hyperspectral camera 150 is a camera that can measure the brightness of light on a wavelength-by-wavelength basis, and can obtain spectrum for each pixel. In other words, the hyperspectral camera 150 can obtain more detailed wavelength data in addition to the two-dimensional position information. The distance between the diffusing board 130 and the sample 145 or the distance between the hyperspectral camera 150 and the sample 145, as illustrated in FIG. 5, is, for example, 100 mm. However, no limitation is intended thereby.

Next, a hardware configuration of the evaluation unit 160 according to the first embodiment is described with reference to FIG. 7.

Figure 7:
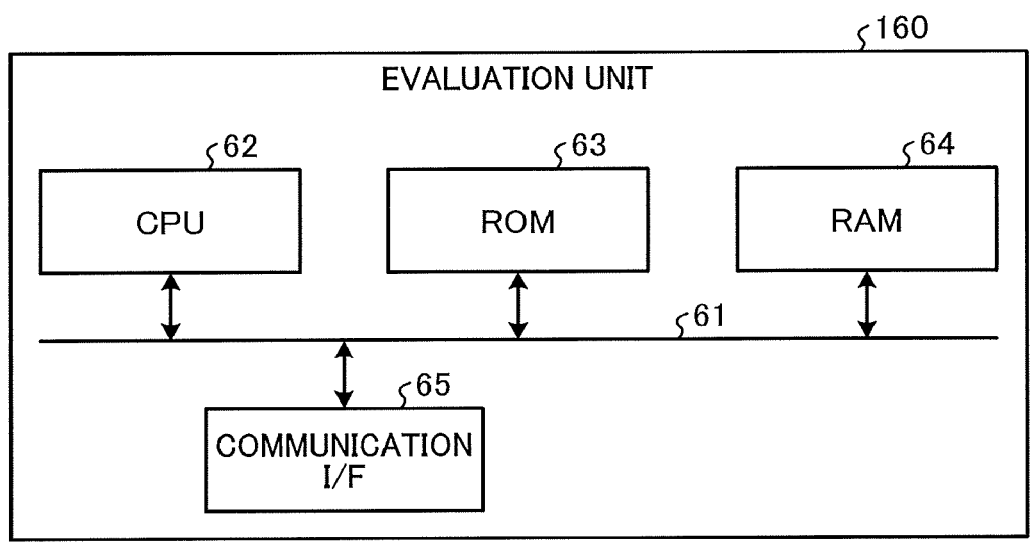
FIG. 7 is a block diagram illustrating a hardware configuration of an evaluation unit according to the first embodiment.

FIG. 7 is a block diagram illustrating a hardware configuration of the evaluation unit 160 according to the first embodiment.

As illustrated in FIG. 7, the evaluation unit 160 includes a central processing unit (CPU) 62, a read only memory (ROM) 63, a random access memory (RAM) 64, and a communication interface (I/F) 65. The above components are interconnected through a bus 61. The evaluation unit 160 is an information processing device such as a personal computer (PC) and a server.

The CPU 62 controls the operation of the evaluation unit 160 in a centralized manner. For example, the CPU 62 uses, for example, RAM 64 as a work area, and executes a program stored, for example, in the ROM 63. By so doing, the CPU 62 controls the overall operation of the evaluation unit 160. Due to this configuration, the evaluation unit 160 can implement various kinds of functions as will be described later in detail. The communication interface 65 controls the communication with the hyperspectral camera 150 or other external devices. For example, the communication interface 65 receives the input of the two-dimensional image data that is captured and obtained by the hyperspectral camera 150. Moreover, the evaluation unit 160 may be provided with, for example, an interface connected to an input device such as a keyboard through which various kinds of information is input, and an interface connected to an output device such as a display through which various kinds of information is output. Further, the evaluation unit 160 may be provided with, for example, a hard disk drive (HDD) that is a nonvolatile storage device used to store various kinds of data.

Next, a functional configuration of the evaluation unit 160 according to the first embodiment is described with reference to FIG. 8.

Figure 8:
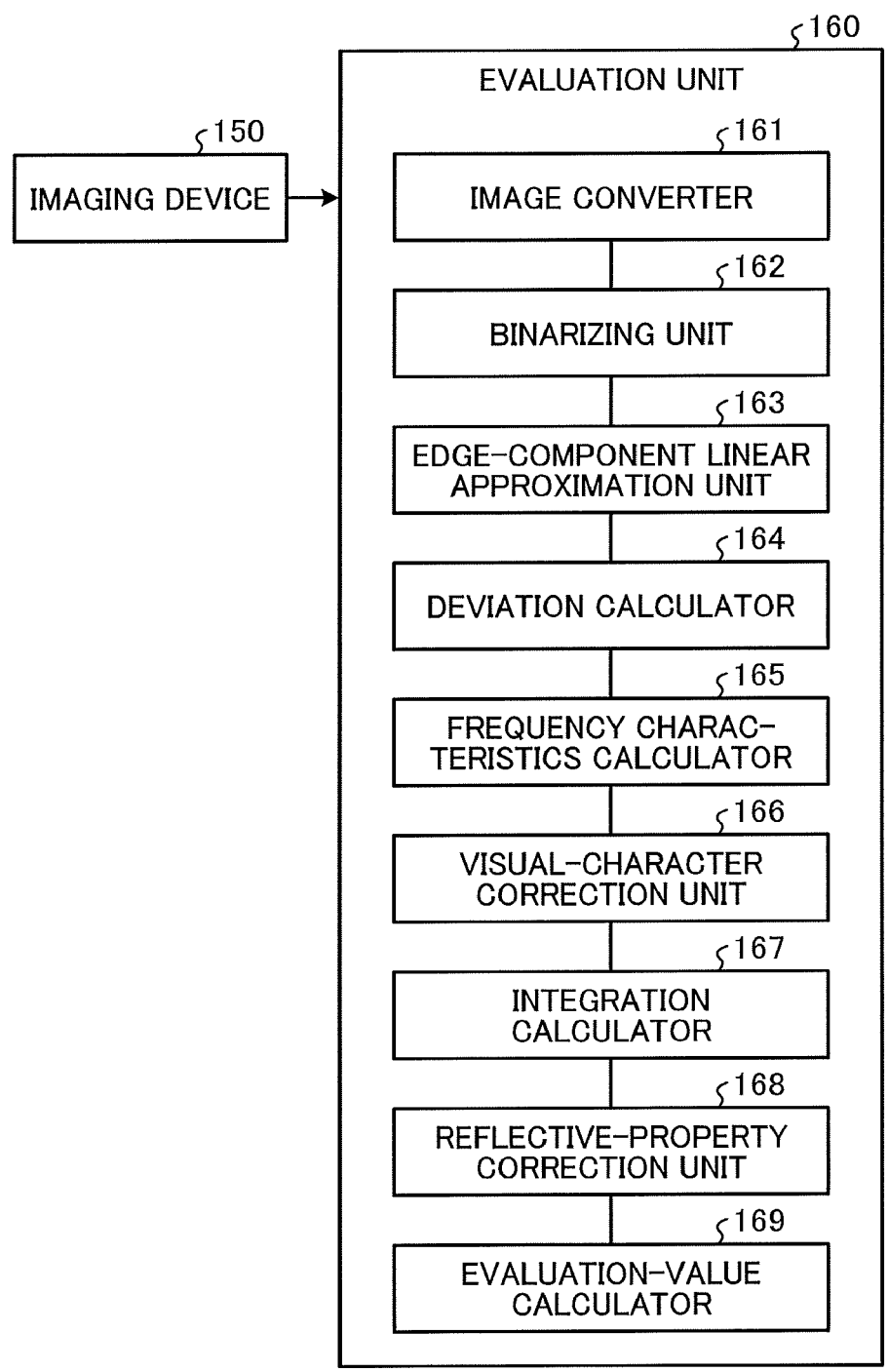
FIG. 8 is a block diagram illustrating a functional configuration of an evaluation unit according to the first embodiment.

FIG. 8 is a block diagram illustrating a functional configuration of the evaluation unit 160 according to the first embodiment.

In FIG. 8, the hyperspectral camera 150 is depicted as the imaging device 150.

The evaluation unit 160 includes an image converter 161, a binarizing unit 162, an edge-component linear approximation unit 163, a deviation calculator 164, and a frequency characteristics calculator 165. Moreover, the evaluation unit 160 includes a visual-character correction unit 166, an integration calculator 167, a reflective-property correction unit 168, and an evaluation-value calculator 169. Some of or all of these elements may be implemented by execution of software (program), or may also be implemented by hardware circuitry.

The image converter 161 receives the image data that is captured and obtained by the imaging device 150 (i.e., the hyperspectral camera), and converts the received image data into L*a*b* image data. As described above, the imaging device 150 can obtain spectral data for every 10 nm. The image converter 161 converts the obtained spectral data into reflectance image data with reference to the spectral data of a reference whiteboard, and converts the reflectance image data into image data in an XYZ color system, according to the spectral data of illumination and the color matching functions. Further, the image data in an XYZ color system is converted into L*a*b* image data. The conversion into L*a*b* image data is performed to be adapted to the human sensitivity. Note also that the reference whiteboard is disposed at the position of the sample 145 in advance and the image of the reference whiteboard is captured by the imaging device 150. As will be described later, for example, the L* image data is used to evaluate the changes in edge. It is advantageous to use the L* image data because the L* image data can approximate human vision.

The spectral distribution can be changed depending on the viewing condition of the sample 145. For example, when the image clarity is computed assuming a situation in which the sample 145 is observed in office environments, the distribution of a light source of the CIE Standard Illuminant D50 is used. Alternatively, when the image clarity is computed assuming a situation in which the sample 145 is observed in good-weather outdoor environments, the distribution of a light source of the CIE Standard Illuminant D65 is used. Accordingly, the evaluation value can be calculated and obtained in view of the viewing condition.

The binarizing unit 162 binarizes lightness image data (L*image data). For example, the binarizing unit 162 binarizes the L* image data of the L*a*b* image data, which is obtained by the conversion performed by the image converter 161, with a prescribed threshold, and obtains the number for the amount of change in shape of the edge of the projection pattern 101. Due to this configuration, the changes in the projection pattern 101 can be observed in a clearer manner.

The edge-component linear approximation unit 163 calculates and obtains an approximate straight line for the shape-changing positions of the edges of the binarized image data. For example, the edge-component linear approximation unit 163 calculates and obtains an approximate straight line using the method of least squares.

Figure 9:
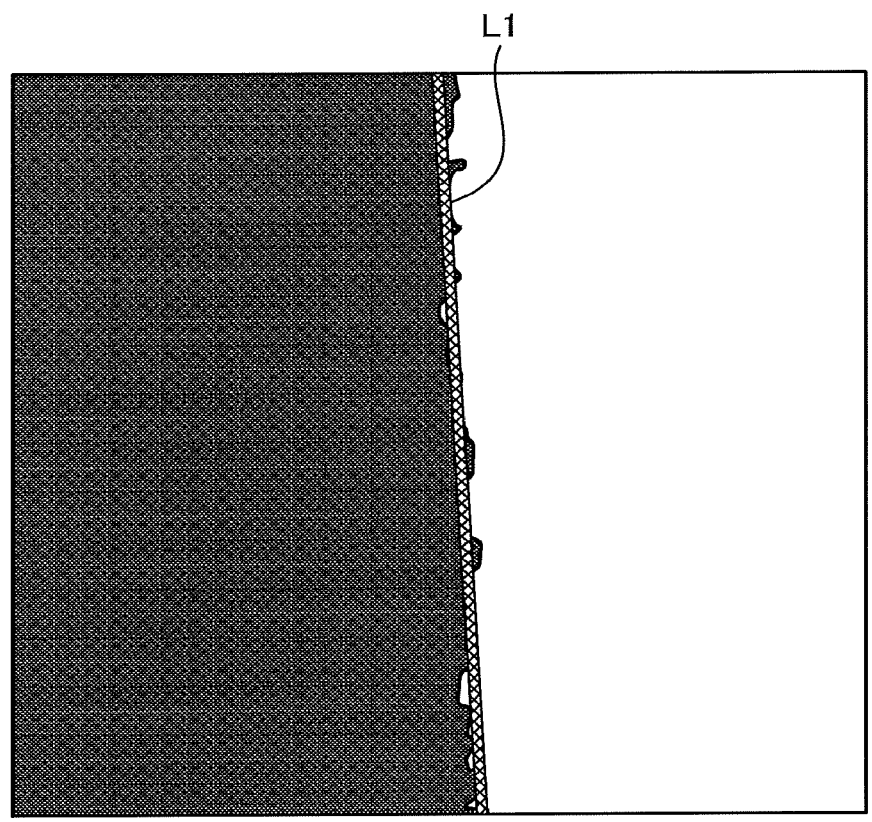
FIG. 9 is a diagram illustrating an approximate straight line drawn for the edges of a binarized image data, according to an embodiment of the present disclosure.

FIG. 9 is a diagram illustrating an approximate straight line drawn for the edges of the binarized image data, according to the present embodiment.

For example, an L1 as illustrated in FIG. 9 indicates an approximate straight line. In FIG. 9, the measurement size is about 30 millimeters (mm)×30 mm, and the resolution is about 625 dots per inch (dpi).

The deviation calculator 164 calculates how much the shape of edge changes (deviation image) with reference to the approximate straight line, on a line-by-line basis. For example, the deviation calculator 164 calculates by how many pixels the position of an edge changes to the right or left side with reference to the approximate straight line L1 that is calculated and obtained by the edge-component linear approximation unit 163 (changes in edge), in descending order from the edge on the topside of the image data (see FIG. 9).

The frequency characteristics calculator 165 calculates and obtains the frequency characteristics of the changes in edge. For example, the frequency characteristics calculator 165 performs Fourier transform on the changes in edge (deviation image) that is obtained by the deviation calculator 164, to calculate and obtain the frequency characteristics of an edge-change portion.

The visual-character correction unit 166 assigns a weight to the frequency characteristics of an edge-change portion using data that reflects the characteristics of human visual perception. For example, the visual-character correction unit 166 assigns a weight to the frequency characteristics of an edge-change portion calculated and obtained by the frequency characteristics calculator 165, using the visual transfer function (VTF) that is used to reflect the characteristics of human visual perception.

Here, the visual transfer function (VTF) is described in detail. The visual transfer function (VTF) refers to the characteristic of spatial frequency of the human visual perception. The frequency characteristics of an edge-change portion is multiplied by the visual transfer function (VTF) to assign a weight to the frequency characteristics. Accordingly, the frequency characteristics in subjective evaluation that are corrected by the sensitivity of the human visual perception in viewing distance can be calculated and obtained. There are a number of reports on the visual transfer function (VTF). In particular, the visual transfer function (VTF) that is related to changes in lightness, which is used by Dooley et al., is well known.

Figure 10:
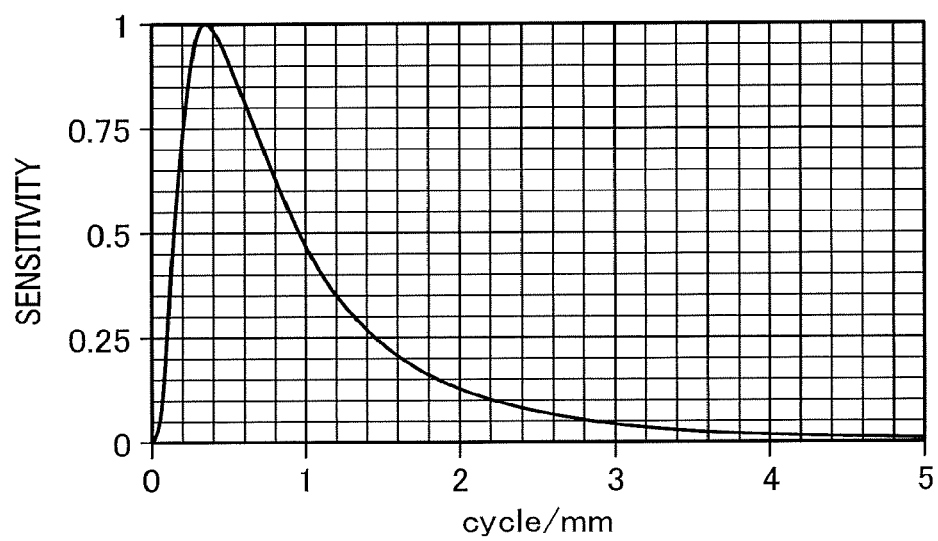
FIG. 10 is a diagram illustrating the visual transfer function (VTF) in a subjective evaluation experiment, according to the related art.

FIG. 10 is a diagram illustrating the visual transfer function (VTF) in a subjective evaluation experiment, according to the related art. In particular, FIG. 10 depicts the visual transfer function (VTF) when the viewing distance in the subjective evaluation experiment is 500 mm. As illustrated in FIG. 10, the peak of sensitivity is at the point of about 0.3 cycle/mm, and the sensitivity gets closer to 0 after the point of about 4 cycle/mm. In other words, as at what degree of wavelength the peak of the viewability of human eyes exists or at what degree of wavelength the viewability of human eyes hardly exists are apparent, a weight is assigned accordingly. In the present embodiment, the use of noise that is unrelated to human visual perception (the data of the wavelengths that can hardly be sensed by human sensitivity) can be controlled by the processes of the frequency characteristics calculator 165 or the visual-character correction unit 166.

The integration calculator 167 integrates the frequency characteristics that are weighted by the visual-character correction unit 166.

The reflective-property correction unit 168 corrects the integrated value of each one of the samples 145 using the color data of each one of the samples 145.

Figure 11:
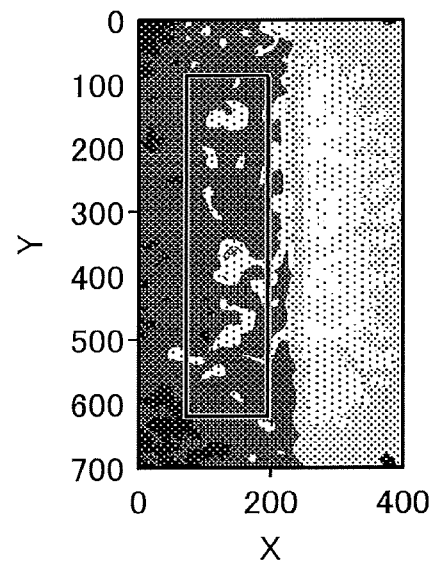
FIG. 11 is a diagram illustrating color data correction according to the first embodiment.

FIG. 11 is a diagram illustrating color data correction according to the first embodiment.

As illustrated in FIG. 11, the reflective-property correction unit 168 calculates the average L*a*b* from the L*a*b* of each pixel of the area (i.e., the rectangular frame in the drawing) that is partly shielded from light by the projection pattern 101. Then, the reflective-property correction unit 168 divides the integrated value, which is calculated and obtained by the integration calculator 167, by the color difference $\Delta E_{black}$ with black (L*, a*, b*)=(0, 0, 0). As the color of the surface of the sample 145 has a higher level of lightness and a higher level of color saturation, the corrected integrated value becomes smaller.

When the difference between the color of the object reflected in the sample 145 and the color of the surface of the sample 145 is small, the distortion of the object reflected in the sample 145 does not stand out. Due to such circumstances, the reflective-property correction unit 168 performs correction using the color data. For example, the distortion of the sample 145 in black stands out more than the sample 145 in silver does. In other words, the reflective-property correction unit 168 performs correction using the difference between black (L*, a*, b*)=(0, 0, 0) where the distortion is considered to stand out most and the color of the foundation of the sample 145 (i.e., the area that is partly shielded from light by the projection pattern 101), which is actually measured.

The evaluation-value calculator 169 calculates the evaluation value of the image clarity for each one of the samples 145. For example, the evaluation-value calculator 169 calculates the evaluation value of the image clarity of each one of the samples 145 using Formula 2 given below. Formula 2 is a logarithmic equation in view of Weber-Fechner's law that "The relationship between stimulus and human sensitivity is logarithmic." In this formula, y denotes the image-clarity evaluation value, and x denotes the integrated value. According to the experimental results, for example, $q_1=0.80$, and $q_2=-2.86$. According to Formula 2, as the color difference with black is smaller, $\Delta E_{black}$ that is the denominator decreases in number and the image-clarity evaluation value y increases. In a similar manner, according to Formula 2, as the color difference with black is greater, $\Delta E_{black}$ that is the denominator increases in number and the image-clarity evaluation value y decreases.

$$y = \log\left[\frac{1+x}{(1+\Delta E_{black})^{q_1}}\right] + q_2 \quad \text{[Formula 2]}$$

Figure 12:
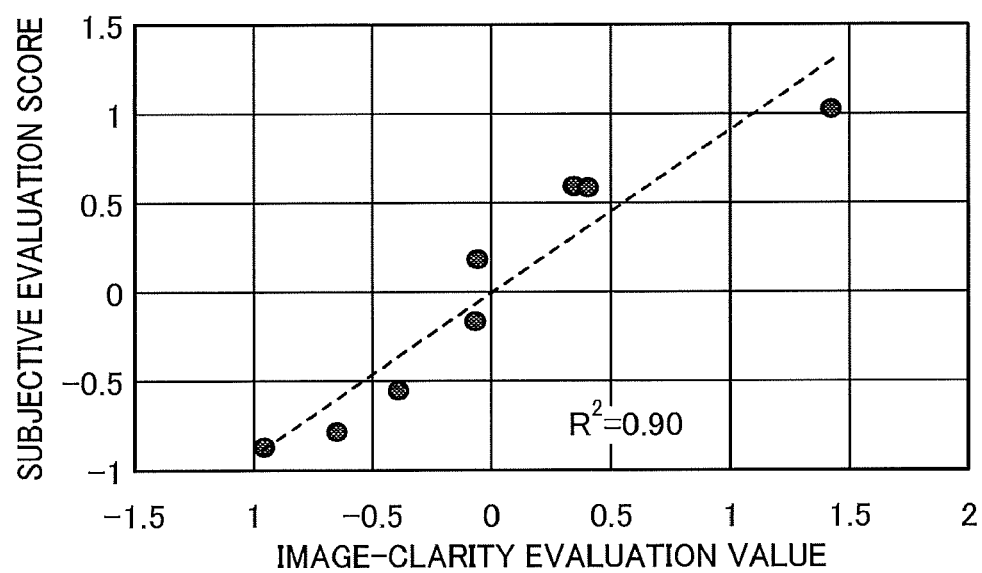
FIG. 12 is a diagram illustrating the correlation between image-clarity evaluation values and subjective evaluation scores, according to the first embodiment.

FIG. 12 is a diagram illustrating the correlation between the image-clarity evaluation values and the subjective evaluation scores, according to the first embodiment.

In FIG. 12, each of the samples 145 is indicated by a circle (dot). As illustrated in FIG. 12, the contribution ratio $R^2$ is 0.90, which is very high, and it is recognizable that there is no inversion among the samples that have significant differences in evaluation value with the order in the subjective evaluation. In other words, for the samples 145 of the colors including metallic colors, the evaluation obtained by the formula for evaluation as in Formula 2 indicates a high correlation with the evaluation obtained by visual examination.

Figure 13:
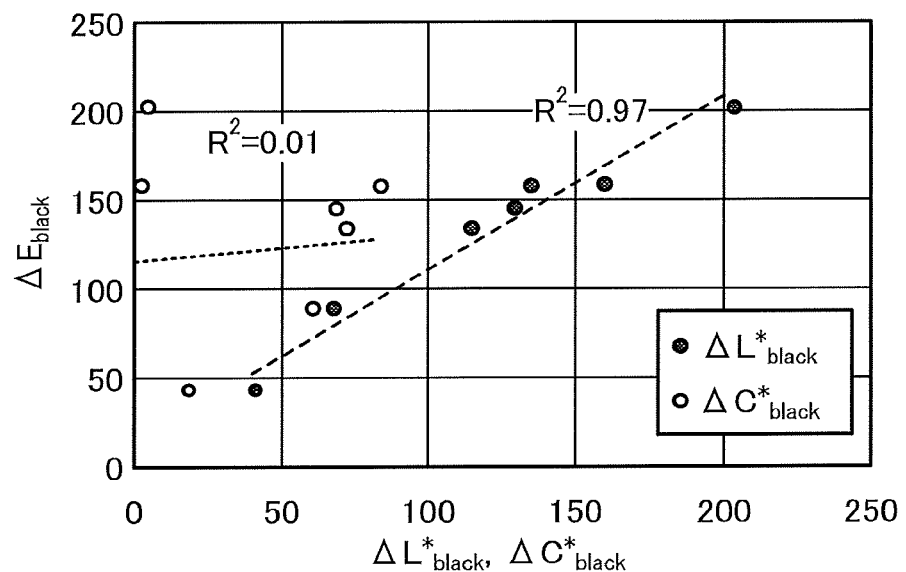
FIG. 13 is a diagram illustrating the correlation between the color difference and each of the lightness difference and the color-saturation difference, according to an embodiment of the present disclosure.

Note that the elements of the color data, which is used by the reflective-property correction unit 168 to perform correction, include the levels of lightness and color saturation. In order to figure out the color components that contribute to the value of $\Delta E_{black}$, the correlation between the color difference $\Delta E_{black}$ and the lightness difference $\Delta L^*$black and the correlation between the color difference $\Delta E_{black}$ and the color-saturation difference $\Delta C^*$black are observed, respectively. FIG. 13 is a diagram illustrating the correlation between the color difference and each of the lightness difference and the color-saturation difference. As illustrated in FIG. 13, the contribution ratio $R^2$ of the lightness difference $\Delta L^*$black is 0.97, and the contribution ratio $R^2$ of the color-saturation difference $\Delta C^*$black is 0.01. This indicates that the contribution of the lightness difference is significantly high.

Figure 14:
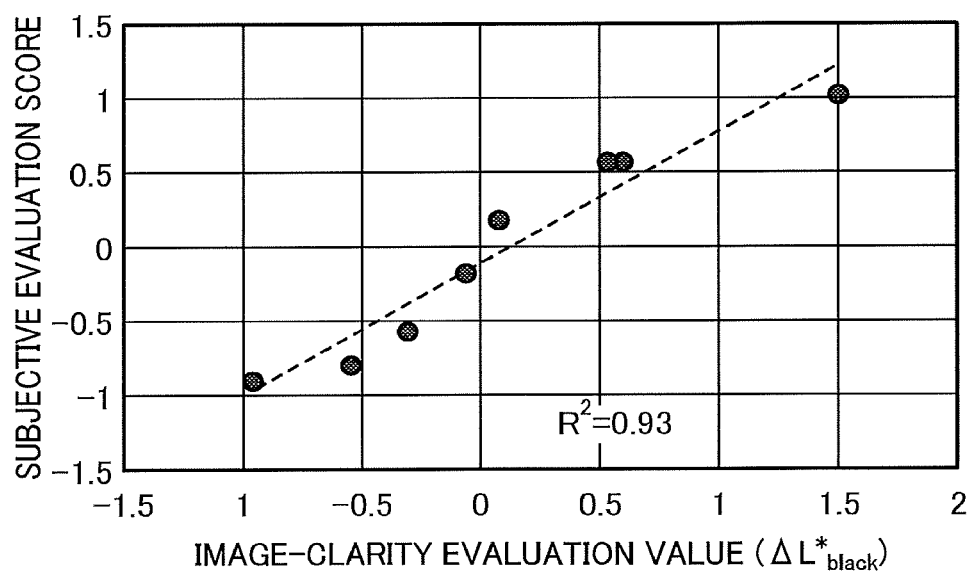
FIG. 14 is a diagram illustrating the correlation between the image-clarity evaluation values and the subjective evaluation scores when correction is performed using lightness differences, according to an embodiment of the present disclosure.

FIG. 14 is a diagram illustrating the correlation between the image-clarity evaluation values and the subjective evaluation scores when correction is performed using lightness differences.

As illustrated in FIG. 14, the contribution ratio $R^2$ is 0.93. This indicates that the contribution ratio in FIG. 14 is higher than the contribution ratio in the scatter diagram of FIG. 12.

Accordingly, even when only lightness data is used for correction on the samples 145 that are used in the present embodiment, evaluation that is consistent with the visual check by human eyes can be achieved.

Next, the flow of image-clarity evaluation processes according to the first embodiment is described with reference to FIG. 15.

Figure 15:
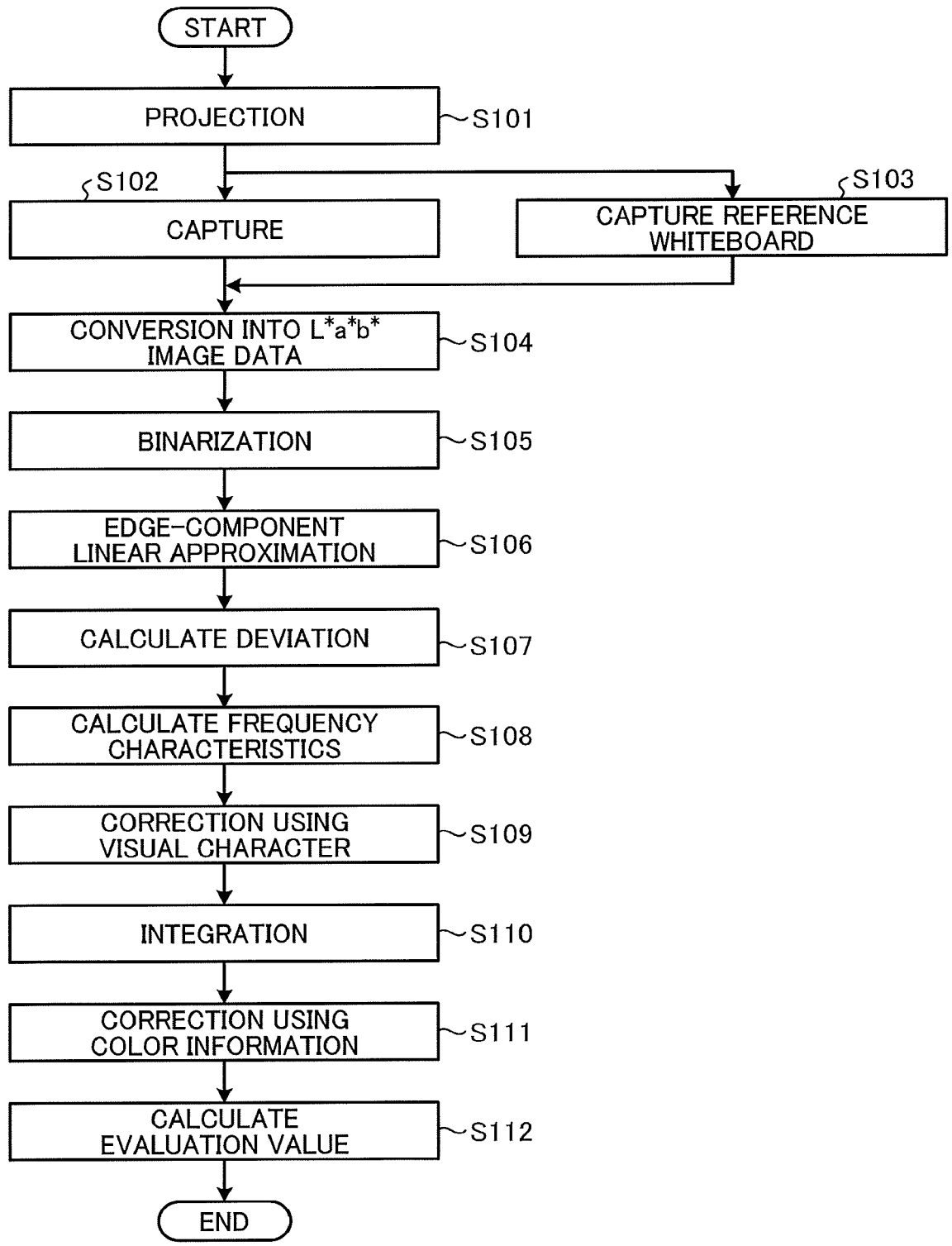
FIG. 15 is a flowchart of image-clarity evaluation processes according to the first embodiment.

FIG. 15 is a flowchart of image-clarity evaluation processes according to the first embodiment.

As illustrated in FIG. 15, the evaluation device 100 turns on the light source 110, and then starts projection (step S101). Accordingly, the light that is emitted from the light source 110 is collimated by the telecentric lens 120, and an image is formed on the diffusing board 130. Then, the virtual image 102 of the projection pattern 101 that is disposed on the diffusing board 130 is projected onto the sample 145 that is attached to the sample stage 140.

Then, the evaluation device 100 captures the virtual image 102 that is projected onto the sample 145 by the hyperspectral camera 150 to obtain two-dimensional image data (step S102). Moreover, in parallel with the capturing of the sample 145, the evaluation device 100 captures the reference whiteboard to obtain two-dimensional image data (step S103). Note that the processes in the step S103 may be performed in advance of the image-clarity evaluation, and the obtained two-dimensional image data may be stored in the storage device (for example, the RAM 64 or a HDD) of the evaluation unit 160.

Subsequently, the evaluation device 100 converts the two-dimensional image data that is captured and obtained by the hyperspectral camera 150 into L*a*b* image data (step S104). For example, the evaluation device 100 converts the spectral data obtained for the sample 145 and the spectral data obtained for the reference whiteboard into L*a*b* image data. Then, the evaluation device 100 binarizes the L* image data with a prescribed threshold based on the L*a*b* image data, and obtains the number for the amount of change in shape of the edge of the projection pattern 101 (step S105).

Then, the evaluation device 100 calculates and obtains an approximate straight line using the method of least squares for the shape-changing positions of the edges of the binarized image data (step S106). Subsequently, the evaluation device 100 calculates how much the shape of edge changes with reference to the approximate straight line, on a line-by-line basis (step S107). In other words, the evaluation device 100 calculates the amount of distortion. Then, the evaluation device 100 performs Fourier transform on the changes in edge to calculate and obtain the frequency characteristics of an edge-change portion (step S108). Then, the evaluation device 100 assigns a weight to the frequency characteristics of an edge-change portion using the visual transfer function (VTF) that is used to reflect the characteristics of human visual perception (step S109).

Subsequently, the evaluation device 100 integrates the weighted frequency characteristics (step S110). Then, the evaluation device 100 corrects an integrated value of the sample 145 using the color data of the sample 145 (step S111). For example, the evaluation device 100 calculates the average L*a*b* from the L*a*b* of each pixel of the light shielding member of the projection pattern 101, and divides the integrated value by the color difference $\Delta E_{black}$ with black. Then, the evaluation device 100 calculates and obtains the evaluation value of the image clarity of the sample 145 using Formula 2 as above (step S112). As described above, lightness difference $\Delta L^{*}black$ may be used to calculate and obtain the evaluation value in place of $\Delta E_{black}$.

As described above, based on the image data that is obtained by capturing the sample 145 onto which the projection pattern 101 having an edge component is projected, the evaluation device 100 corrects the amount of change in the shape of the virtual image of the projection pattern 101 reflected in the sample 145, using color data, and evaluates the image clarity of surface of the sample 145. Accordingly, the evaluation device 100 can evaluate the image clarity with a high degree of accuracy.

Moreover, the evaluation device 100 corrects the amount of change in the shape of the virtual image of the projection pattern 101 reflected in the sample 145, using the color data of the surface of the sample 145. Due to this configuration, the image-clarity evaluation that is more adjusted for the human chromatic sensitivity can be performed. Moreover, the evaluation device 100 evaluates the image clarity of surface of the sample 145 based on the subjective evaluation data that is obtained in advance. Due to this configuration, the evaluation value that highly correlates with the human perception can be calculated and obtained.

Moreover, the evaluation device 100 two-dimensionally measures the image clarity using the hyperspectral camera 150. Due to this configuration, the evaluation result in which the characteristics of the image clarity that is actually viewed and perceived by human are reflected can be derived. Moreover, the evaluation device 100 focuses on and captures an image of the virtual image 102. Due to this configuration, the image of the distortion on surface of the sample 145 can be captured with a high degree of precision.

Second Embodiment

In the above first embodiment, cases in which the hyperspectral camera 150 is used are described by way of example. The camera may be 3-channel red, green, and blue (RGB) camera. In the second embodiment, cases in which a RGB camera is used in place of the hyperspectral camera 150 are described by way of example. In the description of the second embodiment, like reference signs are given to elements similar to those of the evaluation device 100 described in the first embodiment, and their detailed description may be omitted.

Next, a functional configuration of an evaluation unit 160*a* according to the second embodiment is described with reference to FIG. 16.

Figure 16:
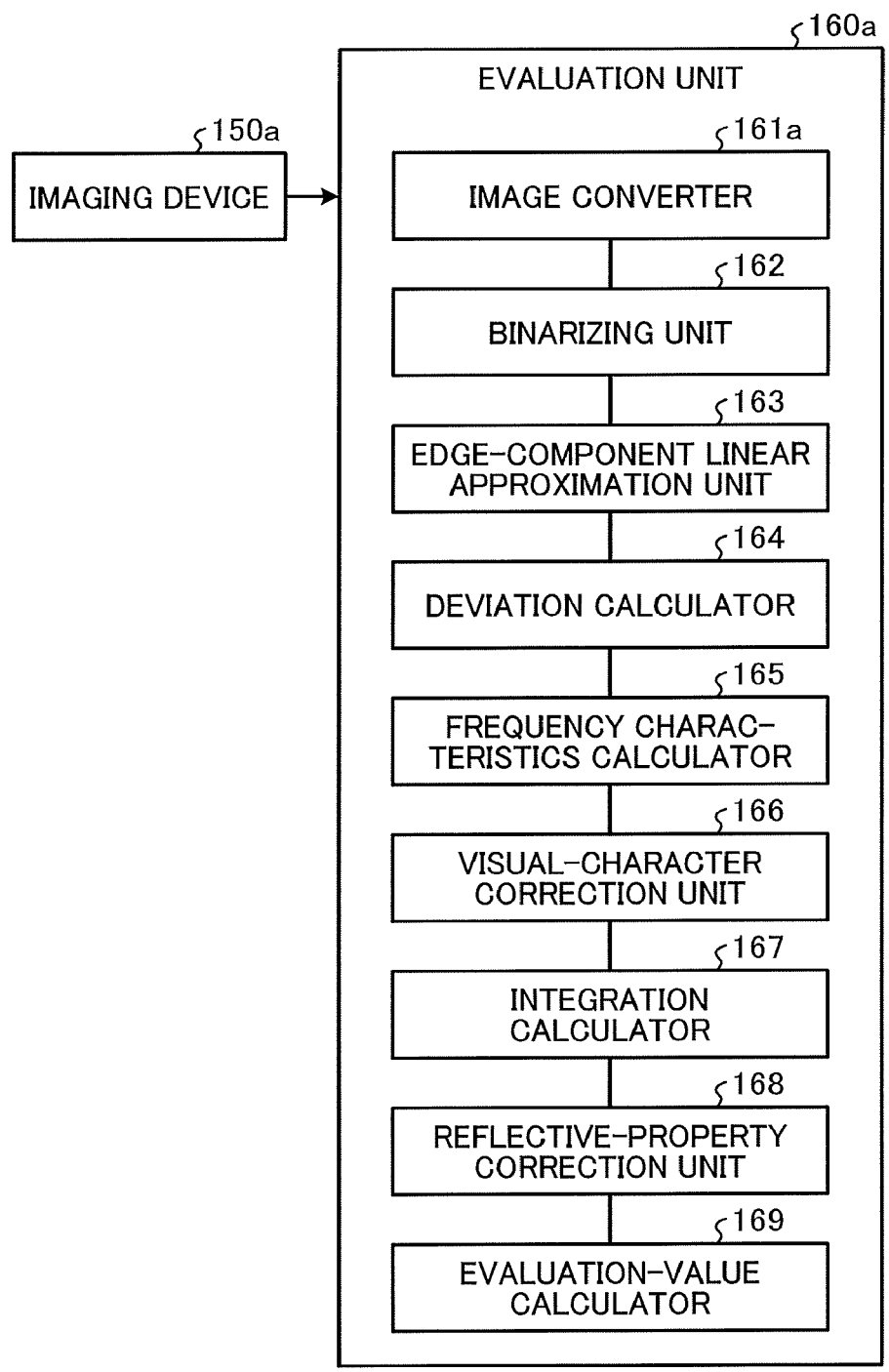
FIG. 16 is a block diagram illustrating a functional configuration of an evaluation unit according to a second embodiment.

FIG. 16 is a block diagram illustrating a functional configuration of the evaluation unit 160*a* according to the second embodiment.

In FIG. 16, the RGB camera is depicted as an imaging device 150*a*. In the second embodiment, the evaluation device may be referred to as an evaluation device 100*a* as deemed appropriate.

The evaluation unit 160*a* includes an image converter 161*a*, the binarizing unit 162, the edge-component linear approximation unit 163, the deviation calculator 164, and the frequency characteristics calculator 165. Moreover, the evaluation unit 160*a* includes the visual-character correction unit 166, the integration calculator 167, the reflective-property correction unit 168, and the evaluation-value calculator 169. Some of or all of these elements may be implemented by execution of software (program), or may also be implemented by hardware circuitry.

The image converter 161*a* receives the image data that is captured and obtained by the imaging device 150*a* (i.e., the RGB camera), and converts the received image data into XYZ image data. For example, the image converter 161a converts the image data into XYZ image data using Formula 3 given below. In Formula 3, "i" and "j" denote the space coordinates. Note also that the formula that is used to convert RGB image data into XYZ image data is not limited to Formula 3. Formula 3 is a formula for performing conversion that is defined by the international telecommunication union (ITU). In general-purpose RGB cameras such as digital cameras, there are many cases in which y correction is performed on the measured RGB values. In order to handle such a situation, the original RGB values are obtained by performing correction before converting the image data into XYZ image data.

$$\begin{cases} X(i, j) = 0.4305 \cdot R(i, j) + 0.3415 \cdot G(i, j) + 0.1784 \cdot B(i, j) \\ Y(i, j) = 0.2220 \cdot R(i, j) + 0.7067 \cdot G(i, j) + 0.0713 \cdot B(i, j) \\ Z(i, j) = 0.0202 \cdot R(i, j) + 0.1295 \cdot G(i, j) + 0.9394 \cdot B(i, j) \end{cases} \quad \text{[Formula 3]}$$

Next, the flow of image-clarity evaluation processes according to the second embodiment is described with reference to FIG. 17.

Figure 17:
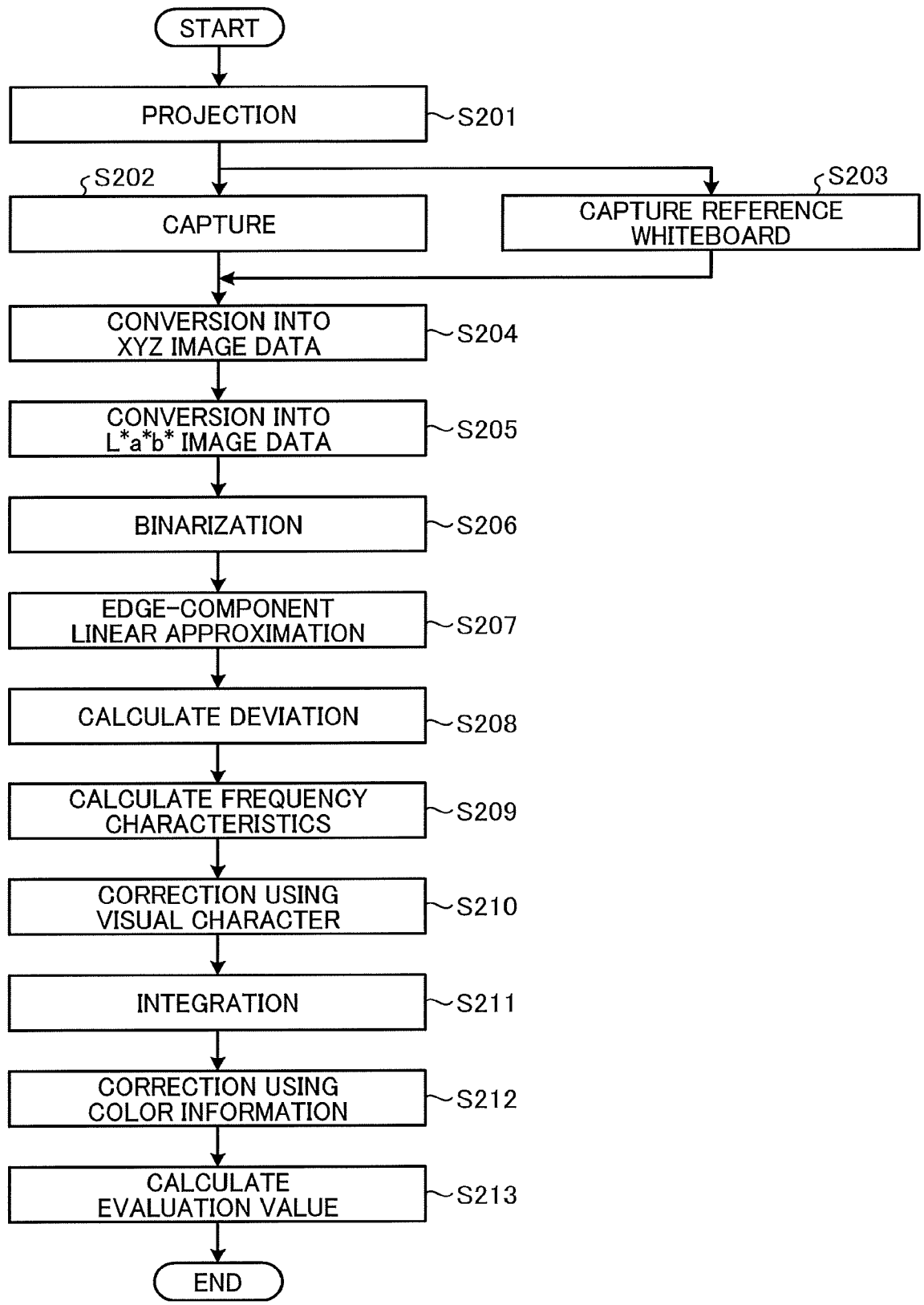
FIG. 17 is a flowchart of image-clarity evaluation processes according to the second embodiment.

FIG. 17 is a flowchart of image-clarity evaluation processes according to the second embodiment.

In FIG. 17, the descriptions of the processes equivalent to those of the image-clarity evaluation processes according to the first embodiment are omitted. In particular, the processes in the step S201 to the step S203 are equivalent to the processes in the step S101 to the step S103. Further, the processes in the step S205 to the step S213 are equivalent to the processes in the step S104 to the step S112.

As illustrated in FIG. 17, the evaluation device 100a receives the image data that is captured and obtained by the imaging device 150a (i.e., the RGB camera), and converts the received image data into XYZ image data (step S204). Then, the evaluation device 100a converts the obtained XYZ image data into L*a*b* image data (step S205).

As described above, the evaluation device 100a two-dimensionally measures the image clarity using an RGB camera. Accordingly, the image clarity can be evaluated with a more cost-effective configuration.

Third Embodiment

In the above first embodiment, cases in which the hyperspectral camera 150 is used are described by way of example. In the first embodiment, the contribution ratio is high in the correlation between the color difference $\Delta E_{black}$ and the lightness difference $\Delta L^*_{black}$ (see FIG. 13). Moreover, the contribution ratio is high in the correlation between the image-clarity evaluation values and the subjective evaluation scores when correction is performed using lightness differences (see FIG. 14). Due to this configuration, it is considered that a monochrome camera may also be used. In the third embodiment, cases in which a monochrome camera is used in place of the hyperspectral camera 150 are described by way of example. In the third embodiment, like reference signs are given to elements similar to those of the evaluation device 100 described in the first embodiment, and their detailed description may be omitted.

Next, a functional configuration of an evaluation unit 160b according to the third embodiment is described with reference to FIG. 18.

Figure 18:
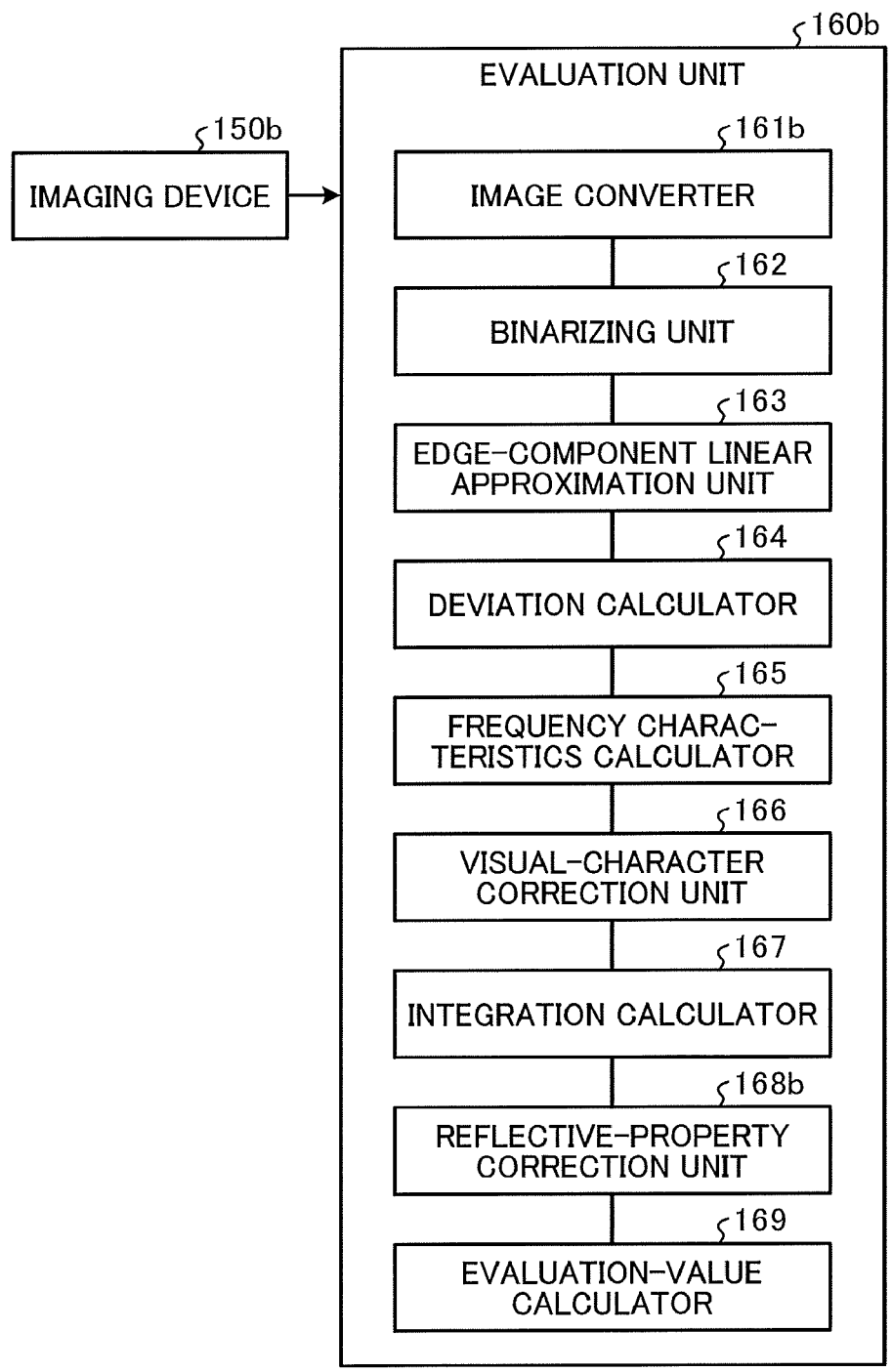
FIG. 18 is a block diagram illustrating a functional configuration of an evaluation unit according to a third embodiment.

FIG. 18 is a block diagram illustrating a functional configuration of the evaluation unit 160b according to the third embodiment.

In FIG. 18, the monochrome camera is depicted as an imaging device 150b. In the third embodiment, the evaluation device may be referred to as an evaluation device 100b as deemed appropriate.

The evaluation unit 160b includes an image converter 161b, the binarizing unit 162, the edge-component linear approximation unit 163, the deviation calculator 164, and the frequency characteristics calculator 165. Moreover, the evaluation unit 160b includes the visual-character correction unit 166, the integration calculator 167, a reflective-property correction unit 168b, and the evaluation-value calculator 169. Some of or all of these elements may be implemented by execution of software (program), or may also be implemented by hardware circuitry.

The image converter 161b receives the image data that is captured and obtained by the imaging device 150b (i.e., the monochrome camera), and converts the received image data into reflectance image data. For example, the image converter 161b converts the image data into reflectance image data using Formula 4 given below. The reflectance image of the sample 145 is calculated and obtained using Formula 4, assuming that the reflectivity of the whiteboard is 100 percent. In Formula 4, "i" and "j" denote the space coordinates.

$$\text{Reflectance Image } R = \frac{\text{Measured Reflectivity } (i, j) \text{ of Sample}}{\text{Measured Reflectivity } (i, j) \text{ of Whiteboard}} \quad \text{[Formula 4]}$$

The reflective-property correction unit 168b corrects the integrated value of each one of the samples 145 using the reflectance data of each one of the samples 145. For example, the reflective-property correction unit 168b divides the integrated value, which is calculated and obtained by the integration calculator 167, by the difference in reflectance $\Delta R_{black}$ between the reflectance "0" of black and the reflectance of the surface of the sample 145. As the surface of the sample 145 has a higher reflectance, the corrected integrated value becomes smaller. In the first embodiment, the contribution ratio of the lightness difference $\Delta L^*_{black}$ is high in the color difference $\Delta E_{black}$. By contrast, in the third embodiment, the reflectivity is measured using a monochrome camera in place of the hyperspectral camera 150 to evaluate the image clarity of the surface of the object.

Next, the flow of image-clarity evaluation processes according to the third embodiment is described with reference to FIG. 19.

Figure 19:
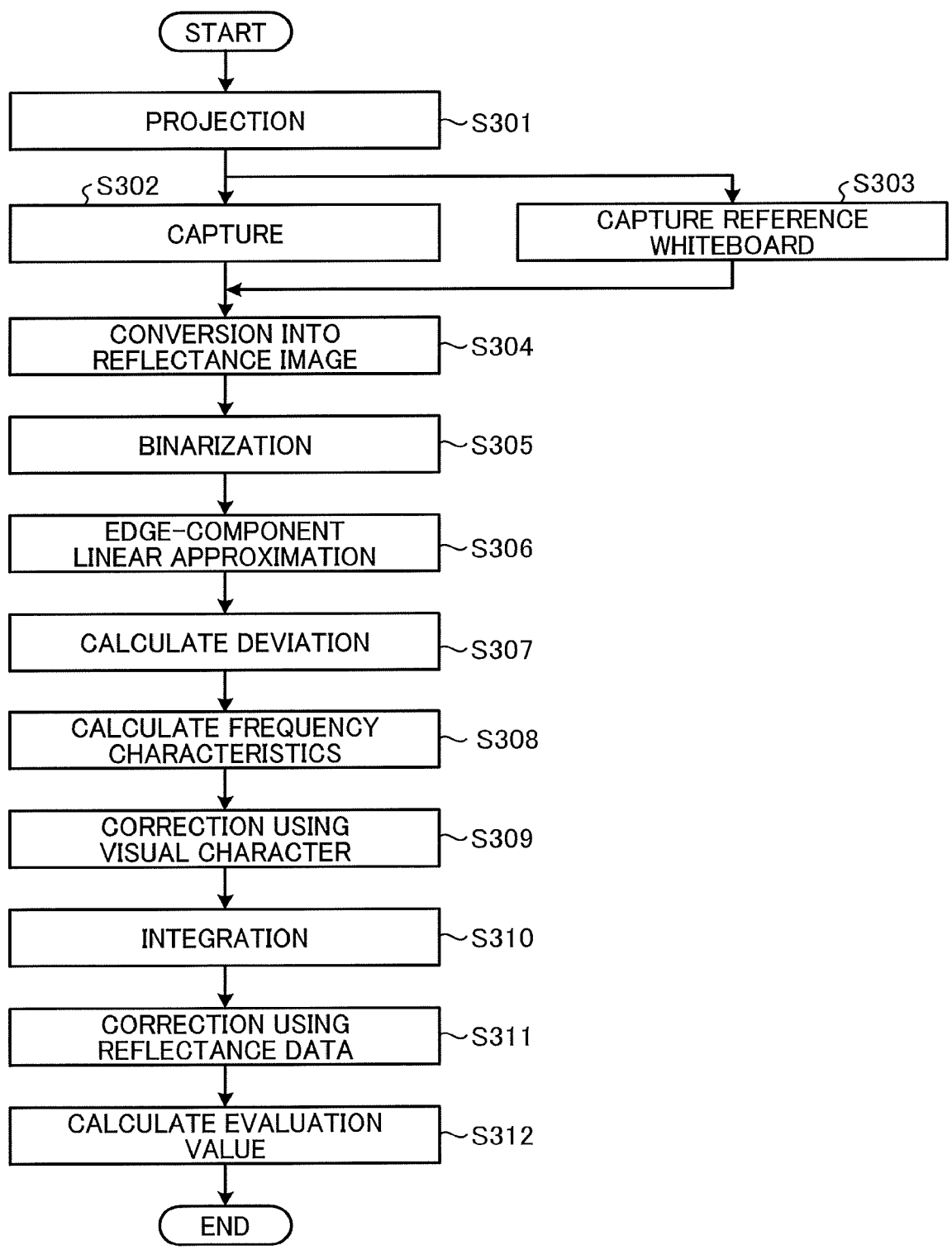
FIG. 19 is a flowchart of image-clarity evaluation processes according to the third embodiment.

FIG. 19 is a flowchart of image-clarity evaluation processes according to the third embodiment.

In FIG. 19, the descriptions of the processes equivalent to those of the image-clarity evaluation processes according to the first embodiment are omitted. In particular, the processes in the step S301 to the step S303 are equivalent to the processes in the step S101 to the step S103. Moreover, the processes in the step S305 to the step S310 are equivalent to the processes in the step S105 to the step S110. Further, the processes in the step S312 are equivalent to the processes in the step S112.

As illustrated in FIG. 19, the evaluation device 100b receives the image data that is captured and obtained by the imaging device 150b (i.e., the monochrome camera), and converts the received image data into reflectance image data (step S304). Moreover, the evaluation device 100*b* corrects an integrated value of the sample 145 using the reflectance data of the sample 145 (step S311). For example, the evaluation device 100*b* divides the obtained integrated value by the difference in reflectance $\Delta R_{black}$ between the reflectance "0" of black and the reflectance of the surface of the sample 145.

As described above, the evaluation device 100*b* measures the reflectance using a monochrome camera, and evaluates the image clarity of surface of the sample 145.

Accordingly, the image clarity can be evaluated with a more cost-effective configuration.

The data as described above or depicted in the drawings, including, for example, the processing procedure, the control procedure, the specific names, and various kinds of data or parameters, may be changed as desired unless otherwise indicated. The elements of the device as depicted in the drawings indicate schematic functions, and it is not necessary for these elements to be physically configured as depicted in the drawings. In other words, the specific embodiments of the distribution or integration of the device are not limited to the embodiments as depicted in the drawings, and some of or all of the device may be functionally or physically distributed or integrated into any number of units depending on, for example, various kinds of load or demands or the condition in which the device is used.

As one example mode, an evaluation program that is executed by, for example, the evaluation unit 160 may be installed for distribution in any desired computer-readable recording medium such as a compact disc, a read-only memory (CD-ROM), a flexible disk (FD), a compact disc-recordable (CD-R), and a digital versatile disk (DVD) in a file format installable or executable by a computer. Moreover, such an evaluation program that is executed by, for example, the evaluation unit 160 may be stored on a computer that is connected to a network such as the Internet so as to be downloaded for distribution through the network. Moreover, such an evaluation program that is executed by, for example, the evaluation unit 160 may be provided or distributed through a network such as the Internet. Further, such an evaluation program that is executed by, for example, the evaluation unit 160 may be integrated in advance, for example, into the ROM inside the device for distribution.

An evaluation program that is executed by the evaluation unit 160 has a module structure that includes at least the above-described elements (e.g., the reflective-property correction unit 168 and the evaluation-value calculator 169). In the actual hardware configuration, a CPU reads and executes the evaluation program stored in a recording medium. Accordingly, the elements of the module structure mentioned as above are loaded into a main memory, and the reflective-property correction unit 168 and the evaluation-value calculator 169 are created in the main memory.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored on any kind of storage medium. Examples of storage media include, but are not limited to, flexible disks, hard disks, optical discs, magneto-optical discs, magnetic tape, nonvolatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An evaluation device, comprising:
   a projector configured to project a pattern having an edge component onto an object;
   an imaging device configured to capture an image of the object using a spectral camera; and
   processing circuitry configured to
      correct an amount of change in shape of a virtual image, of the pattern reflected in the object, using reflective-property data of a surface of the object;
      evaluate an image clarity of the surface of the object based on the corrected amount of change;
      convert the image of the object into spectral image data using first spectral data obtained by capturing the image of the object and second spectral data obtained by capturing an image of a reference whiteboard;
      binarize lightness image data with a prescribed threshold based on the spectral image data to obtain a number for an amount of change in shape of an edge of the pattern;
      calculate an approximate straight line for shape-changing positions of edges of the binarized lightness image data;
      calculate changes in the edge with reference to the approximate straight line;
      calculate frequency characteristics of the changes in the edge;
      assign a weight to the frequency characteristics of the changes in the edge using data that reflects characteristics of human visual perception; and
      integrate the weighted frequency characteristics, wherein
   the processing circuitry corrects an integrated value of the object.

2. The evaluation device according to claim 1, wherein the processing circuitry corrects the amount of change using color data of the surface of the object.

3. The evaluation device according to claim 2, wherein the processing circuitry corrects the amount of change using lightness data of the color data of the surface of the object.

4. The evaluation device according to claim 1, wherein the processing circuitry corrects the amount of change using reflectance data of the surface of the object.

5. The evaluation device according to claim 1, wherein the processing circuitry evaluates the image clarity of the surface of the object based on subjective evaluation data that is obtained in advance.

6. The evaluation device according to claim 1, wherein the imaging device focuses on and captures the image of the virtual image reflected in the object.

7. The evaluation device according to claim 1, wherein the processing circuitry performs a conversion to obtain reflectance image data using the first spectral data and the second spectral data, and converts the obtained reflectance image data into the spectral image data according to the reflectance image data, third spectral data indicative of spectral data of illumination of the projector, and a color matching function.

8. The evaluation device according to claim 7, wherein the processing circuitry uses the third spectral data that varies depending on a viewing condition of the object.

9. The evaluation device according to claim 1, wherein
the spectral camera is a hyperspectral camera, and
the processing circuitry performs conversion to obtain the spectral image data that is L*a*b* image data.

10. The evaluation device according to claim 1, wherein
the spectral camera is an RGB camera, and
the processing circuitry performs conversion to obtain the spectral image data that is XYZ image data.

11. The evaluation device according to claim 1, wherein
the spectral camera is a monochrome camera,
in a case that reflectivity of the reference whiteboard is 100 percent, the processing circuitry performs conversion to obtain the spectral image data that is reflectance image data according to the reflectivity of the reference whiteboard and reflectivity of the object, and
the processing circuitry corrects the integrated value of the object using reflectance data of the surface of the object.

12. An evaluation device, comprising:
processing circuitry configured to
correct an amount of change in shape of a virtual image, of the pattern reflected in the object, based on image data that is obtained by capturing an object onto which a pattern having an edge component is projected, using reflective-property data of a surface of the object;
evaluate an image clarity of the surface of the object based on the corrected amount of change;
convert the image of the object into spectral image data using first spectral data obtained by capturing the image of the object and second spectral data obtained by capturing an image of a reference whiteboard;
binarize lightness image data with a prescribed threshold based on the spectral image data to obtain a number for an amount of change in shape of an edge of the pattern;
calculate an approximate straight line for shape-changing positions of edges of the binarized lightness image data;
calculate changes in the edge with reference to the approximate straight line;
calculate frequency characteristics of the changes in the edge;
assign a weight to the frequency characteristics of the changes in the edge using data that reflects characteristics of human visual perception; and
integrate the weighted frequency characteristics, wherein
the image of the object is captured using a spectral camera, and
the processing circuitry corrects an integrated value of the object.

13. A computer-readable non-transitory recording medium storing a program for causing a computer to execute a method, the method comprising:
correcting an amount of change in shape of a virtual image, of the pattern reflected in the object based on image data that is obtained by capturing an object onto which a pattern having an edge component is projected, using reflective-property data of a surface of the object;
evaluating an image clarity of the surface of the object based on the corrected amount of change;
converting the image of the object into spectral image data using first spectral data obtained by capturing the image of the object and second spectral data obtained by capturing an image of a reference whiteboard;
binarizing lightness image data with a prescribed threshold based on the spectral image data to obtain a number for an amount of change in shape of an edge of the pattern;
calculating an approximate straight line for shape-changing positions of edges of the binarized lightness image data;
calculating changes in the edge with reference to the approximate straight line;
calculating frequency characteristics of the changes in the edge;
assigning a weight to the frequency characteristics of the changes in the edge using data that reflects characteristics of human visual perception; and
integrating the weighted frequency characteristics, wherein
the image of the object is captured using a spectral camera, and
the computer corrects an integrated value of the object.

* * * * *